(12) United States Patent
Reed et al.

(10) Patent No.: US 8,763,909 B2
(45) Date of Patent: Jul. 1, 2014

(54) TERMINAL COMPRISING MOUNT FOR SUPPORTING A MECHANICAL COMPONENT

(75) Inventors: Sherri Reed, Charlotte, NC (US); Eric Linn, Fort Mill, SC (US)

(73) Assignee: Hand Held Products, Inc., Fort Mill, SC (US)

(*) Notice: Subject to any disclaimer, the term of this patent is extended or adjusted under 35 U.S.C. 154(b) by 65 days.

(21) Appl. No.: 12/984,381

(22) Filed: Jan. 4, 2011

(65) Prior Publication Data

US 2012/0168514 A1   Jul. 5, 2012

(51) Int. Cl.
  *G06K 7/10*   (2006.01)
  *G06K 9/22*   (2006.01)
  *G06K 7/14*   (2006.01)
  *G06K 7/08*   (2006.01)
  *G08B 13/14*  (2006.01)

(52) U.S. Cl.
  USPC ............ 235/472.01; 235/462.45; 235/462.43; 235/462.47; 235/454; 235/449; 235/451; 340/572.8

(58) Field of Classification Search
  USPC ............ 235/462.45, 472.01, 462.43, 462.47, 235/449, 451; 340/572.8
  See application file for complete search history.

(56) References Cited

U.S. PATENT DOCUMENTS

| | | | |
|---|---|---|---|
| 1,708,915 A * | 4/1929 | Deli ................................ 401/52 |
| 4,344,238 A * | 8/1982 | Peyser ............................. 36/7.6 |
| 4,654,631 A | 3/1987 | Kurcbart et al. |
| 4,766,299 A * | 8/1988 | Tierney et al. ............ 235/462.21 |
| 4,907,582 A * | 3/1990 | Meyerrose ................ 128/201.11 |
| 4,993,127 A * | 2/1991 | Mechem et al. ................. 24/701 |
| 5,008,864 A * | 4/1991 | Yoshitake ........................ 368/10 |
| 5,105,958 A * | 4/1992 | Patton ............................ 215/388 |
| 5,142,131 A * | 8/1992 | Collins et al. ............. 235/462.46 |
| 5,155,659 A * | 10/1992 | Kunert ....................... 361/679.56 |
| 5,187,744 A * | 2/1993 | Richter ......................... 379/449 |
| 5,218,187 A * | 6/1993 | Koenck et al. ................ 235/375 |
| 5,218,188 A * | 6/1993 | Hanson ......................... 235/375 |
| D341,821 S * | 11/1993 | Savio ........................... D14/341 |
| 5,322,991 A * | 6/1994 | Hanson ..................... 235/462.46 |
| 5,331,136 A * | 7/1994 | Koenck et al. ................ 235/375 |
| 5,340,972 A * | 8/1994 | Sandor ..................... 235/462.44 |
| 5,349,497 A * | 9/1994 | Hanson et al. ........... 361/679.58 |
| 5,371,348 A * | 12/1994 | Kumar et al. .............. 235/472.02 |
| 5,380,994 A * | 1/1995 | Ray ............................ 235/462.45 |
| 5,410,141 A * | 4/1995 | Koenck et al. ............ 235/472.02 |
| 5,471,042 A * | 11/1995 | Kirkeby et al. ........... 235/472.02 |
| 5,485,653 A * | 1/1996 | Knowlton et al. ............. 15/340.4 |
| 5,515,303 A * | 5/1996 | Cargin et al. ............. 361/679.32 |
| 5,679,943 A * | 10/1997 | Schultz et al. ............ 235/472.02 |
| 5,736,726 A * | 4/1998 | VanHorn et al. ......... 235/472.02 |
| 5,747,786 A * | 5/1998 | Cargin et al. ............. 235/462.46 |
| 5,767,502 A * | 6/1998 | Ferland et al. ............ 235/462.48 |
| 5,805,474 A * | 9/1998 | Danielson et al. ....... 361/679.56 |
| 5,917,175 A * | 6/1999 | Miller et al. ............. 235/472.01 |
| 6,003,205 A * | 12/1999 | Dehaven ......................... 16/425 |
| 6,032,339 A * | 3/2000 | D'Addario ..................... 24/649 |
| 6,047,443 A * | 4/2000 | Komiyama ................. 16/114.1 |

(Continued)

*Primary Examiner* — Daniel Walsh

(74) *Attorney, Agent, or Firm* — Additon, Higgins, Pendleton & Ashe, P.A.

(57) ABSTRACT

There is set forth herein a terminal having a mount for supporting a mechanical component. The terminal in one embodiment can be hand held and in one embodiment the mechanical component can comprise a hand strap. In one embodiment a terminal can include a pocket for receiving a mount.

15 Claims, 6 Drawing Sheets

(56) References Cited

U.S. PATENT DOCUMENTS

| | | | |
|---|---|---|---|
| 6,080,922 A * | 6/2000 | Dimbath | 84/327 |
| 6,081,695 A | 6/2000 | Wallace et al. | |
| 6,099,444 A * | 8/2000 | Domenge | 482/110 |
| 6,138,914 A * | 10/2000 | Campo et al. | 235/472.01 |
| 6,318,687 B2 * | 11/2001 | Trana et al. | 248/220.21 |
| 6,345,751 B1 * | 2/2002 | Elliot | 224/646 |
| 6,696,986 B1 * | 2/2004 | Harrison et al. | 341/22 |
| 6,708,838 B2 * | 3/2004 | Bergman et al. | 220/757 |
| 6,724,618 B1 * | 4/2004 | Jenkins et al. | 361/679.32 |
| 6,837,435 B2 * | 1/2005 | Kehoe et al. | 235/472.01 |
| 6,991,829 B2 * | 1/2006 | Bergman | 427/429 |
| 6,995,976 B2 | 2/2006 | Richardson | |
| 6,999,797 B2 * | 2/2006 | Crawford et al. | 455/564 |
| 7,023,692 B2 * | 4/2006 | Mansutti et al. | 361/679.56 |
| 7,147,163 B2 | 12/2006 | Salvato et al. | |
| 7,312,984 B2 | 12/2007 | Richardson et al. | |
| 7,338,053 B2 * | 3/2008 | Dayton et al. | 280/37 |
| 7,344,083 B1 * | 3/2008 | Conti et al. | 235/472.01 |
| 7,344,323 B2 | 3/2008 | Fries et al. | |
| 7,412,226 B2 * | 8/2008 | Kayzar et al. | 455/404.2 |
| 7,416,129 B2 | 8/2008 | Bhatia et al. | |
| 7,446,753 B2 * | 11/2008 | Fitch et al. | 345/156 |
| 7,469,809 B2 * | 12/2008 | Rodarte et al. | 224/578 |
| 7,536,210 B1 * | 5/2009 | Morris et al. | 455/575.1 |
| 7,641,117 B2 | 1/2010 | Koenck et al. | |
| 7,663,879 B2 | 2/2010 | Richardson et al. | |
| 7,712,669 B2 * | 5/2010 | Mahany et al. | 235/472.02 |
| 7,882,597 B2 * | 2/2011 | Conti et al. | 24/3.13 |
| 8,428,664 B1 * | 4/2013 | Wyers | 455/575.1 |
| 8,614,883 B2 * | 12/2013 | Reed et al. | 361/679.03 |
| 2001/0002691 A1 * | 6/2001 | Trana | 248/220.21 |
| 2002/0015229 A1 * | 2/2002 | Ogata | 359/516 |
| 2002/0030094 A1 * | 3/2002 | Curry et al. | 235/375 |
| 2002/0036206 A1 * | 3/2002 | Bergman et al. | 220/754 |
| 2002/0044406 A1 * | 4/2002 | Shimoda et al. | 361/679 |
| 2002/0078959 A1 * | 6/2002 | Haeuser | 128/205.22 |
| 2002/0099894 A1 * | 7/2002 | Kehoe et al. | 710/300 |
| 2002/0113129 A1 * | 8/2002 | Metlitsky et al. | 235/462.44 |
| 2002/0162892 A1 * | 11/2002 | Koenck et al. | 235/472.02 |
| 2003/0121981 A1 * | 7/2003 | Slutsky et al. | 235/462.45 |
| 2003/0173242 A1 * | 9/2003 | Fisher et al. | 206/320 |
| 2003/0222150 A1 * | 12/2003 | Sato et al. | 235/472.02 |
| 2004/0118861 A1 * | 6/2004 | Bergman et al. | 220/756 |
| 2004/0186390 A1 * | 9/2004 | Ross et al. | 600/532 |
| 2004/0198241 A1 * | 10/2004 | Crawford et al. | 455/90.1 |
| 2004/0203501 A1 * | 10/2004 | Johnson et al. | 455/90.3 |
| 2004/0204169 A1 | 10/2004 | Goradesky | |
| 2004/0204302 A1 * | 10/2004 | Flynn | 482/124 |
| 2005/0001037 A1 | 1/2005 | Wulff | |
| 2005/0002715 A1 | 1/2005 | Fries et al. | |
| 2005/0017078 A1 * | 1/2005 | Bhatia et al. | 235/462.45 |
| 2005/0023357 A1 * | 2/2005 | Yeh | 235/462.43 |
| 2005/0030707 A1 | 2/2005 | Richardson et al. | |
| 2005/0086410 A1 * | 4/2005 | Landron et al. | 710/303 |
| 2005/0087603 A1 * | 4/2005 | Koenck et al. | 235/472.02 |
| 2005/0161462 A1 * | 7/2005 | Bergman | 220/757 |
| 2005/0210173 A1 * | 9/2005 | Kehoe et al. | 710/260 |
| 2005/0261113 A1 * | 11/2005 | Wilkinson | 482/124 |
| 2005/0284282 A1 * | 12/2005 | D'Addario et al. | 84/327 |
| 2006/0054704 A1 * | 3/2006 | Fitch et al. | 235/472.01 |
| 2006/0148539 A1 * | 7/2006 | Johnson et al. | 455/575.1 |
| 2006/0234785 A1 * | 10/2006 | Lee et al. | 455/575.1 |
| 2006/0274493 A1 | 12/2006 | Richardson et al. | |
| 2006/0279924 A1 | 12/2006 | Richardson et al. | |
| 2007/0007353 A1 * | 1/2007 | Danielson et al. | 235/462.46 |
| 2007/0012705 A1 * | 1/2007 | Bergman | 220/696 |
| 2007/0012727 A1 * | 1/2007 | Licari | 222/167 |
| 2007/0139873 A1 | 6/2007 | Thomas et al. | |
| 2007/0145149 A1 * | 6/2007 | Carnevali | 235/486 |
| 2007/0178950 A1 * | 8/2007 | Lewis et al. | 455/575.6 |
| 2007/0261213 A1 * | 11/2007 | Nolan et al. | 24/300 |
| 2007/0293166 A1 * | 12/2007 | Weiss et al. | 455/128 |
| 2008/0048971 A1 * | 2/2008 | Beckhusen et al. | 345/156 |
| 2008/0078070 A1 * | 4/2008 | Weiss et al. | 24/318 |
| 2008/0133807 A1 | 6/2008 | Landron et al. | |
| 2008/0148530 A1 * | 6/2008 | Conti | 24/265 EC |
| 2008/0148536 A1 * | 6/2008 | Conti et al. | 24/479 |
| 2008/0318646 A1 * | 12/2008 | Lin | 455/575.4 |
| 2009/0009945 A1 | 1/2009 | Johnson et al. | |
| 2009/0015194 A1 * | 1/2009 | Cargin et al. | 320/106 |
| 2009/0025529 A1 * | 1/2009 | Perrotta | 84/327 |
| 2009/0219677 A1 | 9/2009 | Mori et al. | |
| 2009/0322277 A1 * | 12/2009 | Cargin et al. | 320/106 |
| 2010/0008028 A1 | 1/2010 | Richardson et al. | |
| 2010/0072952 A1 * | 3/2010 | Nakajima | 320/150 |
| 2010/0105444 A1 * | 4/2010 | Koenck et al. | 455/566 |
| 2010/0176140 A1 * | 7/2010 | Bergman | 220/754 |
| 2010/0187491 A1 * | 7/2010 | Anson et al. | 256/68 |
| 2011/0011504 A1 * | 1/2011 | Steinbacher | 150/106 |
| 2011/0299231 A1 * | 12/2011 | Gaddis et al. | 361/679.01 |
| 2012/0025684 A1 * | 2/2012 | Trotsky | 312/334.1 |
| 2012/0048901 A1 * | 3/2012 | Wong et al. | 224/257 |
| 2012/0055965 A1 * | 3/2012 | Zhang et al. | 224/269 |
| 2012/0074006 A1 * | 3/2012 | Monaco et al. | 206/320 |
| 2012/0111881 A1 * | 5/2012 | Gaddis et al. | 220/752 |
| 2012/0168514 A1 * | 7/2012 | Reed et al. | 235/472.01 |
| 2012/0192864 A1 * | 8/2012 | Galbraith et al. | 128/203.12 |
| 2012/0200102 A1 * | 8/2012 | McMeans | 294/149 |
| 2012/0327577 A1 * | 12/2012 | Reed et al. | 361/679.03 |
| 2013/0134291 A1 * | 5/2013 | Le Gette et al. | 248/688 |

* cited by examiner

TERMINAL COMPRISING MOUNT FOR SUPPORTING A MECHANICAL COMPONENT

FIELD OF THE INVENTION

The invention relates to hand held terminals and specifically to hand held terminals having hand straps.

BACKGROUND OF THE INVENTION

Hand held terminals are available in a number of varieties including mobile phones and portable data terminals. In some instances, such terminals are equipped with hand straps. Providing a hand strap stabilizes a terminal allowing it to be securely held by an operator. In some instances, a terminal can include a handle, which can extend in a compass direction angularly transverse relative to a compass direction of a terminal axis.

SUMMARY OF THE INVENTION

There is set forth herein a terminal having a mount for supporting a mechanical component. The terminal in one embodiment can be hand held and in one embodiment the mechanical component can comprise a hand strap. In one embodiment a terminal can include a pocket for receiving a mount.

BRIEF DESCRIPTION OF THE DRAWINGS

The features described herein can be better understood with reference to the drawings described below. The drawings are not necessarily to scale, emphasis instead generally being placed upon illustrating the principles of the invention. In the drawings, like numerals are used to indicate like parts throughout the various views.

DETAILED DESCRIPTION OF THE INVENTION

Figure 1:
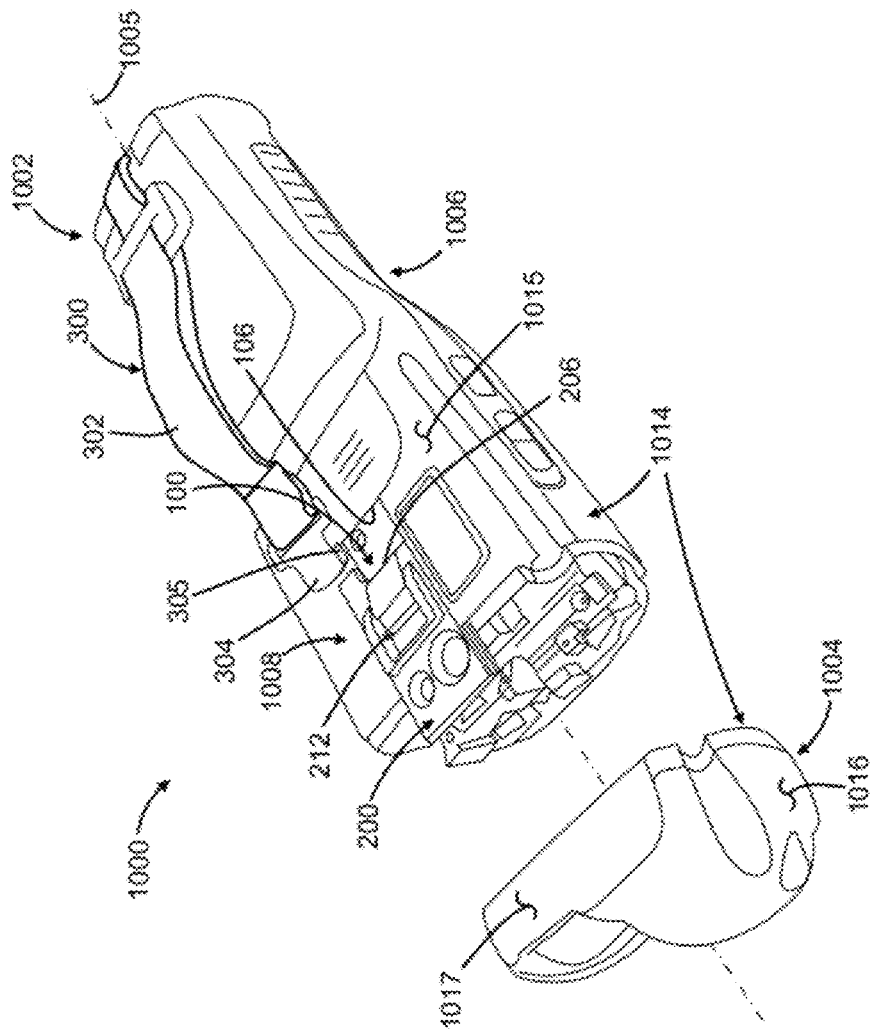
FIG. 1 is a bottom perspective exploded assembly view of a hand held terminal.

Referring to FIG. 1, there is shown a terminal 1000 having a housing 1014 and a pocket 100 for receiving a mount 200.

In one embodiment, terminal 1000 and housing 1014 can be portable and handheld. Terminal 1000 can be an encoded information reading terminal having one or more encoded information reading device. Terminal 1000 can have an axis 1005 extending extensively through a length of terminal 1000.

Referring to further aspect of housing 1014, housing 1014 can comprise a proximal end 1002 and a distal end 1004. Distal end 1004 can also be regarded as a far end or forward end. During most but not all instances of use, proximal end 1002 is located relatively closer to an operator than distal end 1004. Terminal 1000 and housing 1014 can further define a top 1006 and a bottom 1008. Bottom 1008 during most but not all instances of use can be held by an operator closer to a ground level than top 1006.

Referring to further aspects of terminal 1000, pocket 100 of terminal 1000 can have features as shown FIG. 1. Pocket 100 can be adapted to slidably receive mount 200. Details of an embodiment wherein mount 200 is slidably received within pocket 100 are described with reference to FIGS. 2 and 3. Shown in FIG. 2, there can be defined by pocket 100 elongated grooves 102 and 104. Elongated grooves 102 and 104 can be adapted to slidably receive and engage elongated tongues 202 and 204 of mount 200 as are shown in FIG. 3. Elongated tongues 202 and 204 can be formed on a unitary material member. Elongated grooves 102 and 104 of pocket 100 can also be formed on a unitary material member. Referring to further aspects of terminal 1000, elongated grooves 102 and 104 can be formed to be straight parallel with respect to each other, and can be spaced apart from one another. Elongated tongues 202, 204 can likewise be formed on mount 200 to be straight, parallel with respect to one another, and spaced apart from one another.

Terminal 1000 can be adapted so that when mount 200 is received within pocket 100, mount 200 is restricted from being pulled outwardly from pocket 100 in a compass direction transverse to a compass direction of axis 1005 by the engagement of elongated grooves 102 and 104 and elongated tongues 202 and 204. The respective upper surfaces of grooves 102, 104 restrict the lifting of mount 200 out of pocket 100.

In the particular embodiment described mount 200 can be slidably moveable within pocket 100 and can have a closed position. A closed position of mount 200 within pocket 100 can be defined when proximal wall 206, which can be defined by mount 200, abuts against distal wall 106 defined by pocket 100. Terminal 1000 can be adapted so that distal wall 106 restricts movement of mount 200 within pocket 100. In the embodiment shown in FIG. 1, mount 200 is slidably received in pocket 100 in a compass direction coinciding with a compass direction of axis 1005.

In the embodiment shown in FIG. 1, mount 200 can be further supported in pocket 100 by the action of cap 1016 of housing 1014. Namely, terminal 1000 can be adapted so that when mount 200 is moved into a closed position, cap 1016 can be attached to major body portion 1015 of housing 1014. Terminal 1000 can be adapted so that the aforesaid attachment of cap 1016, defining a distal end 1004 of housing 1014 restricts movement of mount 200 in a sliding direction away from a closed position. Terminal 1000 can be adapted so that cap 1004 can be snap fit onto major body portion 1015 and held with friction forces only. In another embodiment terminal 1000 can be adapted so that screws (not shown) can be utilized for the securing of cap 1004 to major body portion 1015.

In the particular embodiment described in FIG. 1, support for retaining mount 200 within pocket 100 is provided partially by pocket 100 and partially by cap 1016. However, in another embodiment, terminal 1000 can be adapted so that support for retaining mount 200 within pocket 100 is provided entirely by pocket 100. For example, while in the specific embodiment of FIG. 1, cap 1004 restricts the movement of mount 200 away from closed position when cap 1004 is attached to major body portion 1015, terminal 1000 can easily be formed so that when cap 1004 is attached to major body portion 1015, mount 200 can be slid over surface 1017 of cap 1004 for removal of mount 200 without removal of cap 1004. In such embodiment mount 200 can be removed by way of a single action and single direction force being imparted to mount 200; namely a single direction force can be imparted to mount 200 for removal of mount 200 from pocket 100. Where cap 1004 restricts movement of mount 200 two actions can be performed for removal of mount 200; namely, removal of cap 1004 and removal of mount 200.

Figure 2:
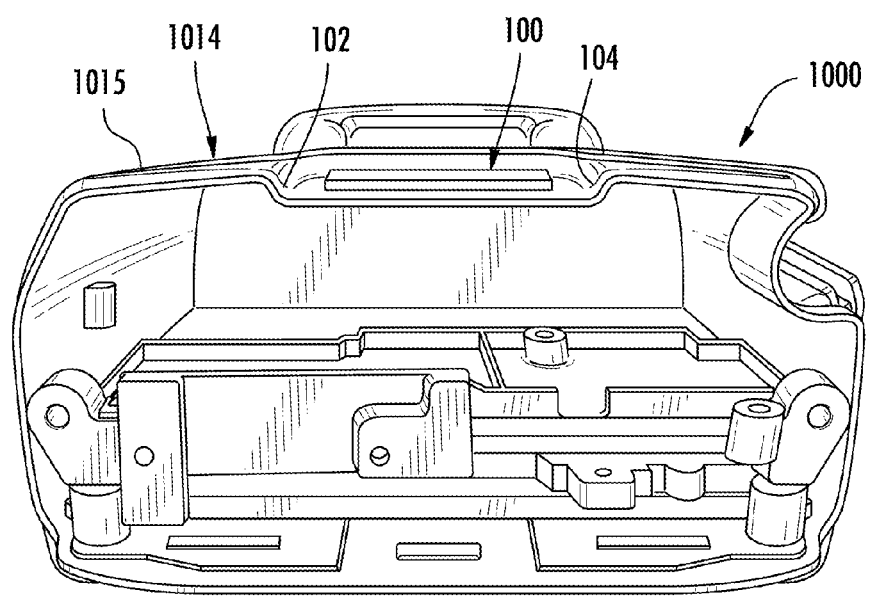
FIG. 2 is a rear perspective cutaway view of a hand held terminal showing details of a pocket thereof in one embodiment for receipt of a mount.
Figure 3:
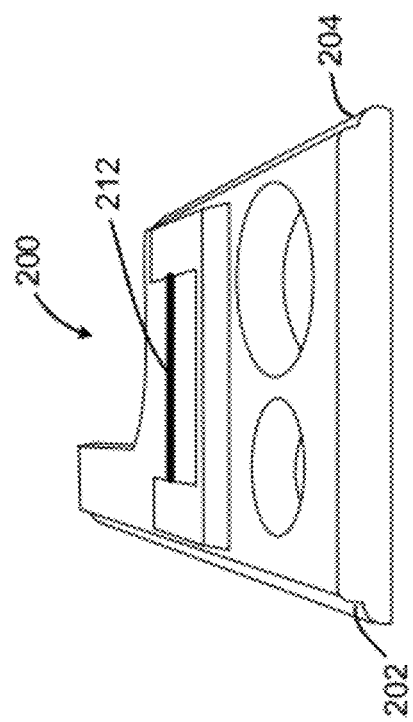
FIG. 3 is a perspective view of a mount for supporting a hand strap, the mount of FIG. 3 being a bar style of hand strap mount.

In the embodiment of FIG. 1 and FIG. 2, pocket 100 is defined by housing 1014, in particular by major body portion 1015 of housing 1014. Grooves 102 and 104 in the embodiment of FIGS. 1 and 2 are defined on a common unitary material member, namely major body portion 1015. Pocket 100 need not be defined by housing 1014, for example pocket 100 can be defined by a material member (not shown) attachable to housing 1014.

In another aspect, terminal 1000 can have more than one mount, e.g. first and second mounts 200 and terminal 1000 can be adapted so that one of the more than one mount can be received in pocket 100 at a given time. Providing of more than one mount can increase usefulness of terminal 1000.

For example, terminal 1000 can be adapted so that by receipt of a first mount in pocket 100, terminal 1000 can be optimized for a first use application and further so that by receipt by a second mount 200 in pocket 100, terminal 1000 can be optimized for a second use application. A more than one mount 200 receivable by pocket 100 can comprise mounts of different styles and/or mounts of different types.

Figure 4:
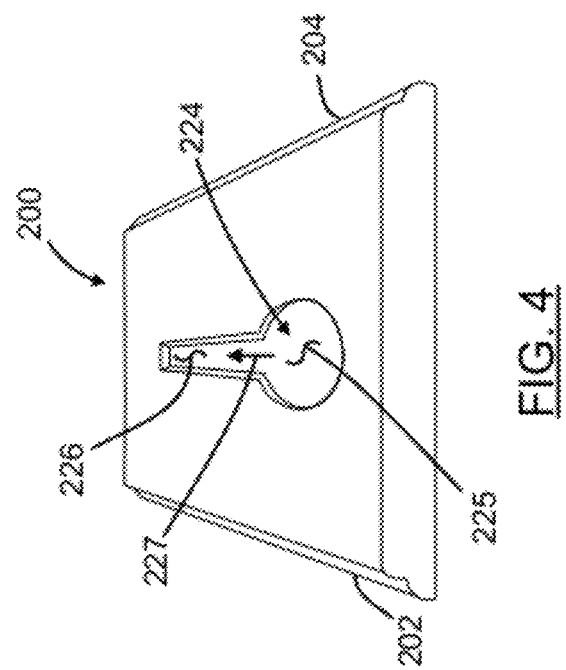
FIG. 4 is a perspective view of a mount for supporting a hand strap according to an alternative style, namely a slotted style of hand strap mount.

Referring to the mounts shown in FIGS. 3 and 4, mount 200 of FIG. 3 and mount 200 of FIG. 4 are both mounts of a hand strap mount type. However, the respective hand strap mounts of FIG. 3 and of FIG. 4 are of different styles. The mount of FIG. 3 is of a bar style that includes a bar 212 for receipt of a hand strap assembly 300. Mount 200 of FIG. 4 is of a slotted style of a hand strap mount and includes a keyhole 224 for receipt of a hand strap assembly 300.

In one embodiment, an operator may prefer one style of hand strap mount over another style of hand strap mount. In one embodiment, a bar style hand strap mount may be able to withstand higher loading i.e. greater pulling forces of greater magnitude than a slotted hand strap mount and a slotted hand strap mount, as shown in FIG. 4, may facilitate easier cleaning than a metal bar style hand strap mount. Thus the hand strap mount of FIG. 3 can be selected for applications where structural strength is prioritized and the hand strap mount of the style as shown in FIG. 4 can be selected where cleanablity is prioritized e.g. as in health care applications wherein terminal 1000 may be subject to disinfecting after use. In one embodiment, a bar style hand strap mount may comprise a metal bar that can corrode as well as define cervices and cavities with respect to material members of the mount 200 which the bar 212 is supported. By contrast, a slotted style of hand strap mount 200, as shown in FIG. 4, can comprise a noncorrosive (e.g., polycarbonate) material member of unitary construction, and hence can be devoid of interfaces between material members of the mount.

Figure 5:
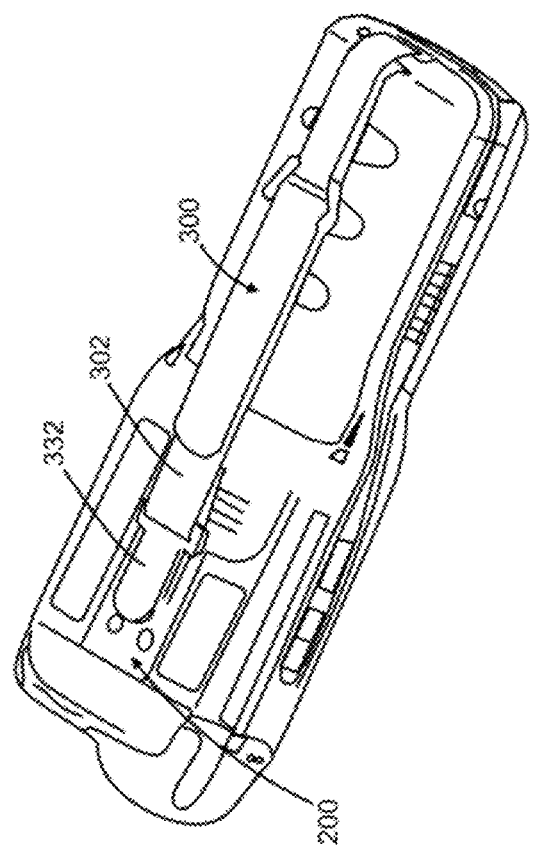
FIG. 5 is a bottom perspective view of a terminal having a hand strap mount of a slotted style of hand strap mount with a hand strap assembly secured to the hand strap mount.

A hand strap assembly 300 for use with bar style of hand strap mount is shown in FIG. 1. A hand strap assembly 300 for use with a slotted style of hand strap mount as shown in FIG. 5. In the embodiment of FIG. 1, hand strap assembly 300 includes a clasp 304 for connecting with bar 212. In one embodiment, bar 212 can be metal and can be of rigid construction. Clasp 304 in one embodiment can comprise metal and in one embodiment can have a hook 305 defined at a distal end of clasp 304. Terminal 1000 can be adapted so that clasp 304 can be snap fit onto bar 212. In one embodiment, hook 305 can define a distance to a major body of clasp 304 that is less than a diameter of bar 212 in an unstressed state but can be resiliently bended to a larger distance so that hook 305 can be fit over bar 212.

In the embodiment of FIG. 5, hand strap 300 includes a clip 332 (shown in greater detail in FIG. 6) for connecting with key slot 214. The hand strap 302 of hand strap assembly 300 as shown in FIG. 1 is shown in disconnected state with clasp 302 being disconnected from metal bar 212. With either of the hand strap style mount as shown in FIG. 1 or the hand strap style mount as shown in FIG. 5, it is seen that hand strap 302 of hand strap assembly 300, when in a connected state, imparts pulling force on mount 200 when in use, which pulling force biases mount 200 in a direction of a closed position of mount 200. By configuring terminal 1000 so that hand strap 302 of hand strap assembly 300 imparts a biasing force biasing mount 200 toward a closed position during use when hand strap 302 is in a connected state there is provided a decreased risk that mount 200 will become removed from pocket 100 during use of terminal 1000.

Referring now to further aspects of mount 200 as shown in FIG. 4, mount 200 can be generally planar and can include a keyhole 224 that is adapted to receive clip 332. Keyhole 224 can include a relatively wider width opening 228 and a relatively narrower width slot 226. Clip 332 in the embodiment of FIG. 6 can have generally planar base 333 and can include head 335 extending from neck 336 that extends from base 333. Terminal 1000 can be configured so that clip 332 can be attached to mount 200 by fitting head into opening 225 and then sliding clip 332 in a direction of arrow 227 into a secured position in which frictional forces between slot 226, 224 and neck 336 and between head 335 and a surface of clip 332 to secure clip 332 in a secured position on mount 200 of the hand strap mount style as shown in FIG. 4. Referring to the view of FIG. 5, it is seen that when a pulling force is imparted by hand strap assembly 300 to bias mount 200 in a closed position that same pulling force will also bias clip 332 in a secure position relative to mount 200, of the style shown in FIG. 4.

Accordingly, the disclosed design advantageously employs the force imparted by hand strap assembly 300 to bias a mount 200 into a closed position and also to bias clip 332 in a secure position.

Regarding hand strap assembly 300, hand strap 302 can comprise a resilient material that has a normal unstressed state and a stretched state. Such material can be, e.g., rubber, silicon or elastic, or various types of fabric. When hand strap 302 is in a stretched state, it will impart a pulling force on bodies to which it is attached as a result of its natural tendency to return to its unstressed state.

Further regarding clip 332, clip 332 can include a loop 388 at a proximal end thereof for receiving hand strap 302.

Figure 8:
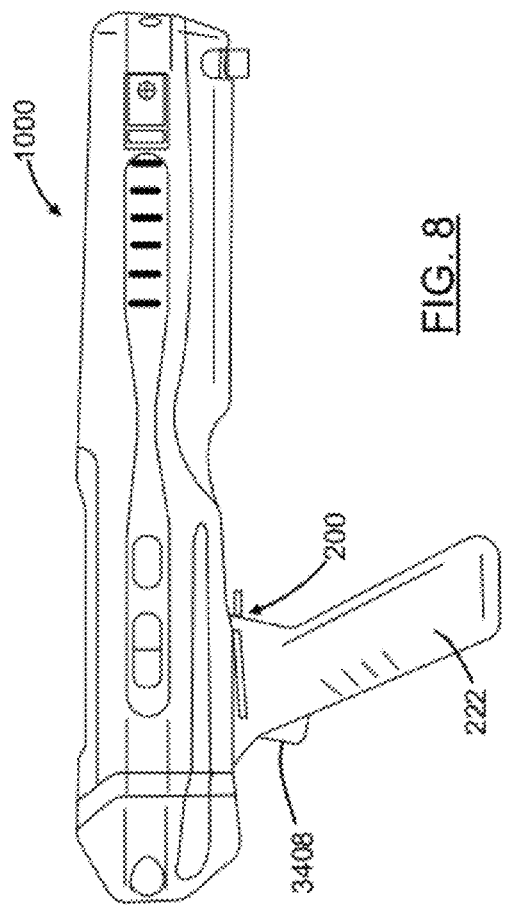
FIG. 8 is a side terminal perspective view of a terminal having a handle that can be part of an assembly including a handle and a mount for supporting the handle, wherein the mount can be removeably received in a pocket of the terminal.
Figure 7:
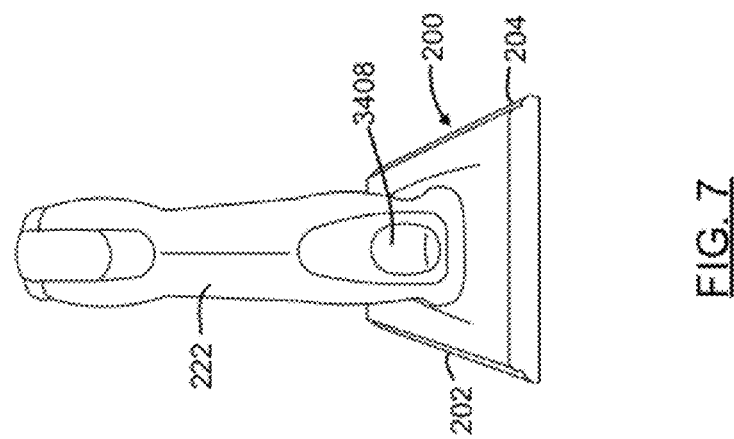
FIG. 7 is a perspective view of a handle mount for supporting a handle.
Figure 9:
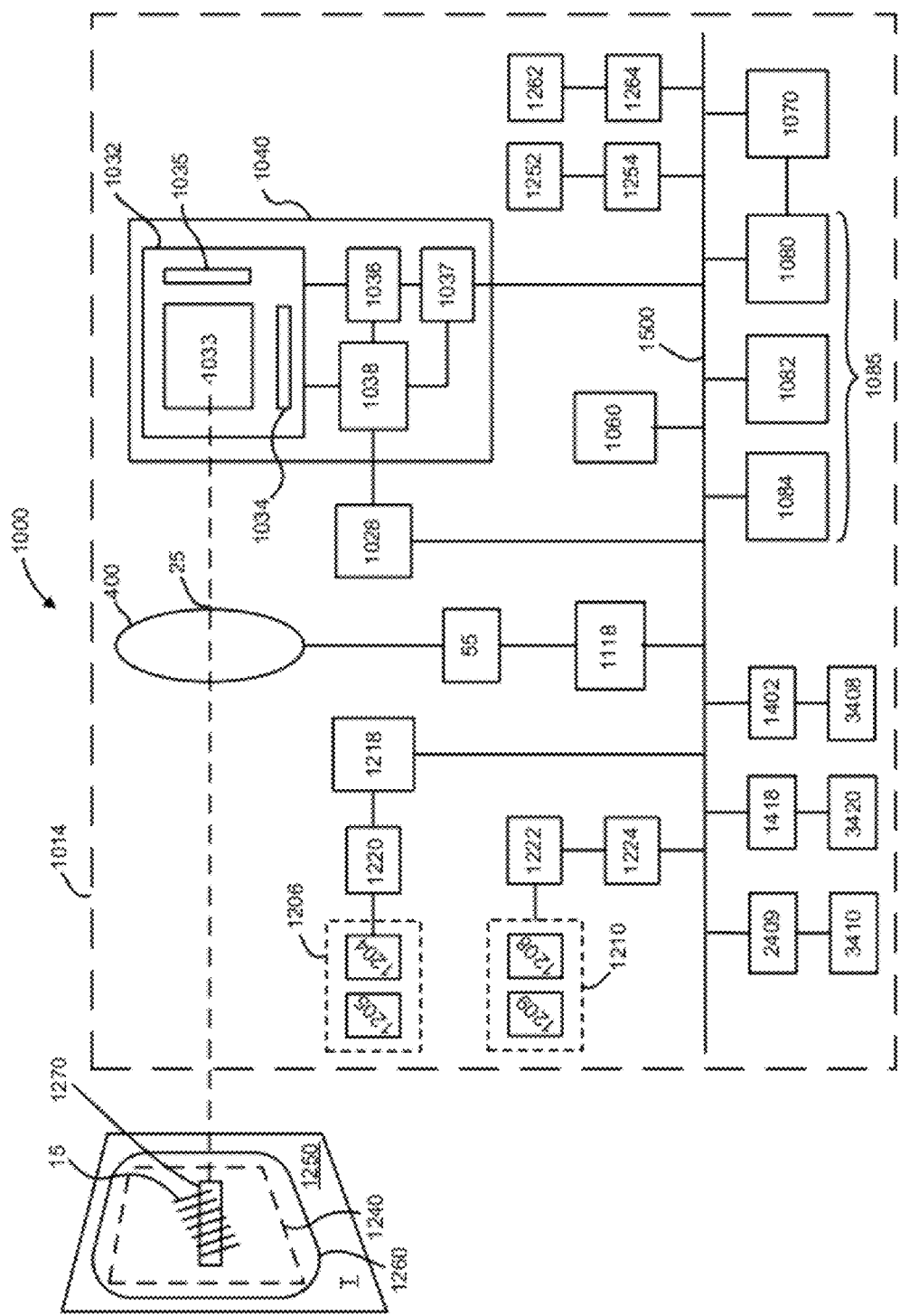
FIG. 9 is a block diagram illustrating various components including electronic components that can be incorporated in a hand held housing of a terminal.

Referring to FIGS. 7 and 8, terminal 1000 can include a mount 200 of a type different than a hand strap mount type. In the embodiment of FIGS. 7 and 8, mount 200 is of handle type and is adapted for supporting a handle 222. Referring FIG. 7, mount 200 is in the previous embodiments of mount 200 can include elongated tongues 202, 204, slidably receivable by elongated grooves 102, 104 of pocket 100. Extending from an area of elongated tongues 202, 204 of mount 200 as shown in FIGS. 7 and 8 can be handle 222 that is supported by mount 200. Handle 222 can be integrally formed with mount 200, i.e., a common unitary material member can define both mount 200 and handle 222. Alternatively, handle 222 can comprise a material member separate from mount 200 that can be rigidly attached to mount 200 and in one embodiment each of mount 200 and handle 222 can comprise more than one member. In the development of terminal 1000, it was determined that with a handle, terminal 1000 can be readily held by an operator without supporting forces provided by strap 300. Accordingly, it was determined that it can be useful to provide on terminal 1000 a common mounting position for both of a hand strap mount and handle type mount, thereby providing space conservation advantages and mounting mechanism conservation advantages, i.e. a single mounting position can be provided for both of a hand strap mount and a handle mount, one of which can be mounted at the mounting position of terminal at a given time. The common mounting position in the embodiment set forth herein is provided by pocket 100.

Configured as described, terminal 1000 facilitates fast changing of mounts for the case where terminal 1000 is to be redeployed for new use applications. Terminal 1000 can be adapted so that a mount 200 can be removed with a limited number of steps and in one embodiment as has been described by a single action consisting of a single direction manually generated force being imparted at mount 200 in a single direction.

Figure 6:
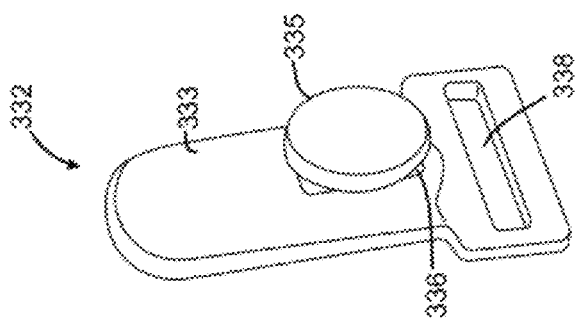
FIG. 6 is a perspective view of a hand strap clip which can be secured to a hand strap mount of a slotted style of hand strap.

Referring now to aspects of an exemplary terminal 1000, terminal 1000 as described in connection with the block diagram of FIG. 6 in one embodiment can be an encoded information reading terminal and can include an image sensor 1032 comprising a multiple pixel image sensor array 1033 having pixels arranged in rows and columns of pixels, associated column circuitry 1034 and row circuitry 1035. Associated with the image sensor 1032 can be amplifier circuitry 1036, and an analog to digital converter 1037 which converts image information in the form of analog signals read out of image sensor array 1033 into image information in the form of digital signals. Image sensor 1032 can also have an associated timing and control circuit 1038 for use in controlling e.g., the exposure period of image sensor 1032, gain applied to the amplifier 1036. The noted circuit components 1032, 1036, 1037, and 1038 can be packaged into a common image sensor integrated circuit 1040. In one embodiment, image sensor integrated circuit 1040 can include less than the highlighted components, e.g., can be devoid of components 1036 to 1037, which can be provided apart from an image sensor integrated circuit 1040. In one example, image sensor integrated circuit 1040 can be provided by an MT9V022 image sensor integrated circuit available from Micron Technology, Inc. In another example, image sensor integrated circuit 1040 can incorporate a Bayer pattern filter. In such an embodiment, CPU 1060 prior to subjecting a frame to further processing can interpolate pixel values for pixel positions intermediate of green pixel position for development of a monochrome frame of image data. Alternatively, CPU 1060 prior to subjecting a frame to further processing can interpolate pixel values at pixel positions intermediate of red pixel positions or blue pixel positions.

In the course of operation of terminal 1000, image signals can be read out of image sensor 1032 and converted and stored into a system memory such as RAM 1080. A memory 1085 of terminal 1000 can include RAM 1080, a nonvolatile memory such as EPROM 1082 and a storage memory device 1084 such as may be provided by a flash memory or a hard drive memory. In one embodiment, terminal 1000 can include CPU 1060 which can be adapted to read out image data stored in memory 1080 and subject such image data to various image processing algorithms. Terminal 1000 can include a direct memory access unit (DMA) 1070 for routing image information read out from image sensor 1032 that has been subject to conversion to RAM 1080. In another embodiment, terminal 1000 can employ a system bus providing for bus arbitration mechanism (e.g., a PCI bus) thus eliminating the need for a central DMA controller. A skilled artisan would appreciate that other embodiments of the system bus architecture and/or direct memory access components providing for efficient data transfer between the image sensor 1032 and RAM 1080 are within the scope and the spirit of the invention.

Referring to further aspects of terminal 1000, imaging lens assembly 400 can be adapted for focusing an image of a decodable indicia 15 located within a field of view 1240 on a substrate 1250 onto image sensor array 1033. Imaging light rays can be transmitted about imaging axis 25. Imaging lens assembly 400 in one embodiment can be adapted to be capable of multiple focal lengths and multiple best focus distances. In one embodiment, imaging lens assembly 400 can be a fixed optical assembly having a fixed focal length and best focus distance.

Terminal 1000 can also include an illumination pattern light source bank 1204 and associated light shaping optics 1205 for generating an illumination pattern 1260 substantially corresponding to a field of view 1240 of terminal 1000. The combination of bank 1204 and optics 1205 can be regarded as an illumination pattern generating assembly 1206. Terminal 1000 can also include an aiming pattern light source bank 1208 and associated light shaping optics 1209 for generating an aiming pattern 1270 on substrate 1250. The combination of bank 1208 and optics 1209 can be regarded as an aiming pattern generating assembly 1210

In use, terminal 1000 can be oriented by an operator with respect to a substrate 1250 bearing decodable indicia 15 in such manner that aiming pattern 1270 is projected on a decodable indicia 15. In the example of FIG. 2, decodable indicia 15 is provided by a 1D bar code symbol. Decodable indicia 15 could also be provided by a 2D bar code symbol or optical character recognition (OCR) characters. Each of illumination pattern light source bank 1204 and aiming pattern light source bank 1208 can include one or more light sources. Imaging lens assembly 400 can be controlled with use of electrical power input unit 55 which provides energy for changing a plane of optimal focus of imaging lens assembly 400. In one embodiment, an electrical power input unit 55 can operate as a controlled voltage source, and in another embodiment, as a controlled current source. Illumination pattern light source bank 1204 can be controlled with use of illumination pattern light source bank control circuit 1220. Aiming pattern light source bank 1208 can be controlled with use of aiming pattern light source bank control circuit 1222. Electrical power input unit 55 can apply signals for changing optical characteristics of imaging lens assembly 400, e.g., for changing a focal length and/or a best focus distance of (a plane of optimum focus of) imaging lens assembly 400. Where imaging lens assembly 400 is a fixed optical assembly, power input unit 55 and its associated interface 1118 can be deleted. Illumination pattern light source bank control circuit 1220 can send signals to illumination pattern light source bank 1204, e.g., for changing a level of illumination output by illumination pattern light source bank 1204. Aiming pattern light source bank control circuit 1222 can send signals to aiming pattern light source bank 1208, e.g., for changing a level of illumination output by aiming pattern light source bank 1208.

Terminal 1000 can also include a number of peripheral devices including trigger 3408 which may be used to make active a trigger signal for activating frame readout and/or certain decoding processes. Terminal 1000 can be adapted so that activation of trigger 3408 activates a trigger signal and initiates a decode attempt. Specifically, terminal 1000 can be operative so that during an operator activated read attempt activated in response to activation of a trigger signal, a succession of frames can be read out and captured by way of read out of image information from image sensor array 1033 (typically in the form of analog signals) and then storage of the image information after conversion into memory 1080 (which can buffer one or more of the succession of frames at a given time). CPU 1060 can be operative to subject one or more of the succession of frames to a decode attempt. For attempting to decode a bar code symbol, CPU 1060 can process image data of a frame corresponding to a line of pixel positions (e.g., a row, a column, or a diagonal set of pixel positions) to determine a spatial pattern of dark and light cells and can convert each light and dark cell pattern determined into a character or character string via table lookup.

CPU 1060, appropriately programmed can carry out a decoding process for attempting to decode a frame of image data. Terminal 1000 can be operative so that CPU 1060 for attempting to decode a frame of image data can address image data of a frame stored in RAM 1080 and can process such image data. For attempting to decode, CPU 1060 can sample image data of a captured frame of image data along a sampling path, e.g., along a first sampling path through a first set of pixel positions. Next, CPU 1060 can perform a second derivative edge detection to detect edges. After completing edge detection, CPU 1060 can determine data indicating widths between edges. CPU 1060 can then search for start/stop character element sequences and if found, derive element sequence characters, character by character by comparing with a character set table. For certain symbologies, CPU 1060 can also perform a checksum computation. If CPU 1060 successfully determines all characters between a start/stop character sequence and successfully calculates a checksum (if applicable), CPU 1060 can output a decoded message. Where a decodable indicia representation is a 2D bar code symbology, a decode attempt executed by CPU 1060 can comprise the steps of locating a finder pattern using a feature detection algorithm, locating scan lines intersecting the finder pattern according to a predetermined relationship with the finder pattern, determining a pattern of dark and light cells along the scan lines, and converting each light pattern into a character or character string via table lookup.

Because image sensor integrated circuit 1040 can output raw signal data that can be subject to indicia decoding, image sensor integrated circuit 1040 can be regarded as an encoded information device in the form of an indicia decoding device. An indicia decoding device in an alternative embodiment can output a decoded message data. Terminal 1000 can include one or more encoded information reading device in addition to or in place of device 1040. For example, terminal 1000 can include RFID reader 1252 and card reader 1262. RFID reader 1252 and card reader 1262 can be coupled to system bus 1500 for communication with CPU 1060 via respective interfaces 1254 and 1264. Reader 1254 and reader 1264 can be adapted to output raw signal data for processing into decoded message data or alternatively can be operative to output decoded message data.

Terminal 1000 can include various interface circuits for coupling various peripheral devices to system address/data bus (system bus) 1500, for communication with CPU 1060 also coupled to system bus 1500. Terminal 1000 can include interface circuit 1028 for coupling image sensor timing and control circuit 1038 to system bus 1500, interface circuit 1118 for coupling electrical power input unit 55 to system bus 1500, interface circuit 1218 for coupling illumination pattern light source bank control circuit 1220 to system bus 1500, interface circuit 1224 for coupling aiming pattern light source bank control circuit 1222 to system bus 1500, and interface circuit 1402 for coupling trigger 3408 to system bus 1500. Terminal 1000 can also include a display 3420 coupled to system bus 1500 and in communication with CPU 1060, via interface 1418, as well as pointer mechanism 3410 in communication with CPU 1060 via interface 2409 connected to system bus 1500.

A small sample of systems methods and apparatus that are described herein is as follows:

A1. A terminal comprising:
 a hand held housing having a top and a bottom, a proximal end and a distal end;
 an encoded information reading device disposed in the housing, the encoded information reading device selected from the group consisting of an indicia reading device an RFID reading device and a card reading device;
 a pocket;
 a mount for supporting a mechanical component slidably received in the pocket, the mechanical component being selected from the group consisting of a hand strap assembly and a handle.

A2. The terminal of A1, wherein the pocket is integrally formed in the housing.

A3. The terminal of A1, wherein the pocket is formed more proximate the distal end than the proximal end.

A4. The terminal of A1, wherein the terminal includes a plurality of encoded information reading devices each selected from the group consisting of an indicia reading device an RFID reading device and a card reading device;

A5. The terminal of A1, wherein the terminal is adapted so that the mount is slidably received in the pocket in a compass direction that coincides with a compass direction of an axis of the housing.

A6. The terminal of A1, wherein the terminal includes a supplementary mount for supporting a mechanical component, the supplementary mount slidably received in the pocket, the pocket adapted to receive one of the mount and supplementary mount at a given time.

A7. The terminal of A1, wherein the pocket is defined by elongated grooved and wherein the mount has elongated tongues slidably received by the elongated grooves.

A8. The terminal of A1, wherein the mechanical component is a hand strap assembly having a hand strap and wherein the terminal is adapted so that the hand strap, when in a connected state, biases the mount toward a closed position.

A9. The terminal of A1, wherein the mechanical component is a hand strap, assembly having a hand strap and wherein the terminal is adapted so that the hand strap, when in a connected state, biases the mount toward a closed position and wherein the mount comprises a keyhole onto which a clip of the hand strap is received, the terminal being adapted so that the hand strap, when in a connected state, biases the clip into a secured position on the mount.

B1. A terminal comprising:
 a hand held housing having a top and a bottom, a proximal end and a distal end;
 an electronic component disposed internally of the hand held housing;
 a pocket;

a first mount adapted for supporting a mechanical component, the terminal being adapted so that the first mount is removeably receivable in the pocket;

a second mount adapted for supporting a mechanical component, the terminal being adapted so that the second mount is removeably receivable in the pocket, wherein the terminal is adapted so that the pocket receives one of the first mount and the second mount at a given time.

B2. The terminal of B1 wherein the first mount is a bar style hand strap mount and wherein the second mount is a slotted style hand strap mount.

B3. The terminal of B1, wherein the first mount is a hand strap mount and wherein the second mount is a handle mount.

B4. The terminal of B1, wherein the terminal is adapted so that the first mount and the second mount are slidably receivable in the pocket.

B5. The terminal of B1, wherein the hand held housing defines the pocket.

B6. The terminal of B1, wherein the terminal comprises cap defining the distal and wherein the terminal is adapted so that the cap provides support to a mount that is received in the pocket.

C1. A terminal comprising:

a hand held housing having a top and a bottom, a proximal end and a distal end;

an electronic component disposed internally of the hand held housing;

a mounting location;

a mount for supporting a hand strap mountable at the mounting location;

a mount for supporting a handle mountable at the mounting location, wherein the terminal is adapted for receiving at the mounting location one of the mount for supporting a hand strap and the mount for supporting a handle at a given time.

C2. The terminal of C1, wherein there is defined at the mounting location a pocket for receiving a mount.

C3. The terminal of C1, wherein there is defined at the mounting location a pocket for slidably receiving a mount.

C4. The terminal of C1, wherein the terminal has a pocket for receiving a received mount, and wherein the terminal is adapted so that the received mount that is received by the pocket can be removed from the pocket by imparting a manually general single direction force at the received mount.

While the present invention has been described with reference to a number of specific embodiments, it will be understood that the true spirit and scope of the invention should be determined only with respect to claims that can be supported by the present specification. Further, while in numerous cases herein wherein systems and apparatuses and methods are described as having a certain number of elements it will be understood that such systems, apparatuses and methods can be practiced with fewer than the mentioned certain number of elements. Also, while a number of particular embodiments have been set forth, it will be understood that features and aspects that have been described with reference to each particular embodiment can be used with each remaining particularly set forth embodiment.

The invention claimed is:

1. A terminal comprising:

a hand held housing having a top and a bottom, a proximal end and a distal end;

an encoded information reading device disposed in the housing, the encoded information reading device selected from the group consisting of an indicia reading device an RFID reading device and a card reading device;

a pocket;

a mount, for supporting a mechanical component, slidably received in the pocket, the mechanical component being selected from the group consisting of a hand strap assembly and a handle;

wherein the mechanical component is a hand strap assembly having a hand strap and wherein the terminal is adapted so that the hand strap, when in a connected state, biases the mount toward a closed position and wherein the mount comprises a keyhole onto which a clip of the hand strap is received, the keyhole including a relatively wider width opening and a relatively narrower width slot, the terminal being adapted so that the hand strap, when in a connected state, biases the clip into a secured position on the mount; and wherein the terminal is adapted so that the hand strap, when in a connected state, biases the clip into a position within the narrower width slot.

2. The terminal of claim 1, wherein the pocket is integrally formed in the housing.

3. The terminal of claim 1, wherein the pocket is formed more proximate the distal end than the proximal end.

4. The terminal of claim 1, wherein the terminal includes a plurality of encoded information reading devices each selected from the group consisting of an indicia reading device an RFID reading device and a card reading device.

5. The terminal of claim 1, wherein the terminal is adapted so that the mount is slidably received in the pocket in a compass direction that coincides with a compass direction of an axis of the housing.

6. The terminal of claim 1, wherein the terminal includes a supplementary mount for supporting a mechanical component, the supplementary mount slidably received in the pocket, the pocket adapted to receive one of the mount and supplementary mount at a given time.

7. The terminal of claim 1, wherein the pocket is defined by elongated grooves and wherein the mount has elongated tongues slidably received by the elongated grooves.

8. The terminal of claim 1, wherein the mechanical component is a hand strap assembly having a hand strap and wherein the terminal is adapted so that the hand strap, when in a connected state, biases the mount toward a closed position.

9. A terminal comprising:

a hand held housing having a top and a bottom, a proximal end and a distal end;

an electronic component disposed internally of the hand held housing;

a pocket;

a first mount adapted for supporting a mechanical component, the terminal being adapted so that the first mount is removeably receivable in the pocket;

a second mount adapted for supporting a mechanical component, the terminal being adapted so that the second mount is removeably receivable in the pocket, wherein the terminal is adapted so that the pocket receives one of the first mount and the second mount at a given time;

wherein the first mount is a bar style hand strap mount and wherein the second mount is a slotted style hand strap mount, the bar style hand strap mount having a metal bar, the slotted style hand strap mount being devoid of metal.

10. The terminal of claim 9, comprising a handle mount.

11. The terminal of claim 9, wherein the terminal is adapted so that the first mount and the second mount are slidably receivable in the pocket.

12. The terminal of claim 9, wherein the hand held housing defines the pocket.

13. The terminal of claim 9, wherein the terminal comprises cap defining the distal and wherein the terminal is adapted so that the cap provides support to a mount that is received in the pocket.

14. A terminal comprising:
- a hand held housing having a top and a bottom, a proximal end and a distal end;
- an electronic component disposed internally of the hand held housing;
- a pocket;
- a first mount adapted for supporting a mechanical component, the terminal being adapted so that the first mount is removeably receivable in the pocket;
- a second mount adapted for supporting a mechanical component, the terminal being adapted so that the second mount is removeably receivable in the pocket, wherein the terminal is adapted so that the pocket receives one of the first mount and the second mount at a given time;
- wherein the first mount is a hand strap mount of multi-component non-unitary construction, and wherein the second mount is a hand strap mount of unitary construction; and
- wherein the first mount is a bar style hand strap mount and wherein the second mount is a slotted style hand strap mount, the bar style hand strap mount having a metal bar, the slotted style hand strap mount being devoid of metal.

15. The terminal of claim 14, wherein the terminal comprises a cap non-integral with and detachably attached to the hand held housing, the cap defining the distal end of the housing and wherein the terminal is adapted so that the cap restricts removal of the first mount and the second mount from the pocket when the cap is attached to the housing.

* * * * *